United States Patent [19]

Watford et al.

[11] Patent Number: 5,174,946

[45] Date of Patent: Dec. 29, 1992

[54] OSCILLATION POWER MONITORING SYSTEM AND METHOD FOR NUCLEAR REACTORS

[75] Inventors: Glen A. Watford; Kiran Kumar, both of San Jose, Calif.

[73] Assignee: General Electric Company, San Jose, Calif.

[21] Appl. No.: 644,349

[22] Filed: Jan. 22, 1991

[51] Int. Cl.⁵ .............................................. G21C 7/00
[52] U.S. Cl. .................................. 376/216; 376/217; 376/278
[58] Field of Search ............... 376/215, 216, 217, 278; 976/DIG. 301, DIG. 300

[56] References Cited

U.S. PATENT DOCUMENTS

| | | | |
|---|---|---|---|
| 3,565,760 | 2/1971 | Parkos et al. | 376/217 |
| 4,584,165 | 4/1986 | Wilson et al. | 376/216 |
| 4,770,843 | 9/1988 | Taleyarkhan | 376/216 |
| 4,839,134 | 6/1989 | Impink, Jr. et al. | 376/216 |
| 4,975,239 | 12/1990 | O'Neil et al. | 376/247 |

Primary Examiner—Brooks H. Hunt
Assistant Examiner—Frederick H. Voss
Attorney, Agent, or Firm—Robert R. Schroeder

[57] ABSTRACT

To detect core-wide and regional neutron flux oxcillations in a nuclear reactor core induced by thermal-hydraulic instabilities, local power range monitoring (LPRM) strings radially distributed throughout the core and having plural vertically spaced neutron flux detectors are locally assigned to individual oscillation power range monitoring (OPRM) cells radially distributed throughout the core. Groups of OPRM cells are assigned to different OPRM channels based on their geographical positions. Detector signals of the LPRM strings assigned to each OPRM cell are processed pursuant to a unique trip algorithm to detect neutron flux oscillations, and, upon meeting prescribed amplitude and frequency criteria, the assigned OPRM channel is tripped. Suppression of a thermal hydraulic instability is initiated when at least two OPRM channels assigned to geographically adjacent OPRM cells are tripped.

18 Claims, 10 Drawing Sheets

OSCILLATION POWER MONITORING SYSTEM AND METHOD FOR NUCLEAR REACTORS

The present invention relates to nuclear reactors and particularly to protecting nuclear reactors from deleterious consequences of thermal-hydraulic instabilities.

BACKGROUND OF THE INVENTION

In known types of nuclear reactors, such as boiling water reactors (BWR), the reactor core comprises a plurality of fuel assemblies arranged in an array capable of self-sustained nuclear fission reaction. The core is contained in a pressure vessel and submerged in water, which serves as both a coolant and a neutron moderator. A plurality of control rods containing neutron absorbing material are insertable in gaps between the fuel assemblies to control the reactivity of the core. Each fuel assembly includes a flow channel through which water is pumped upwardly from a lower plenum to an upper plenum. To monitor the power density of the core, it is common practice to distribute neutron detectors both radially and axially throughout the core. The signals from these neutron detectors are utilized to monitor core conditions and to initiate corrective actions, including reactor shutdown (SCRAM), in the event of a detected abnormality.

One reactor abnormality that has come under close scrutiny due to recent events is thermal-hydraulic instability. As water is pumped upwardly through the fuel assembly flow channels, vaporization occurs. The resulting vapor bubbles are in constant motion, ever expanding and contracting. This produces variations in the two-phase fluid flow through the channels. If these flow variations are not dampened or suppressed by normal flow losses due to friction, they can build into sustained oscillations. Since the fluid is also a neutron moderator, flow oscillations will result in neutron flux oscillations and thus power oscillations along the vertical length of the fuel assemblies. With recent changes in fuel neutronic and heat transfer characteristics, such thermal-hydraulic induced power oscillations could conceivably exceed minimum critical power ratio (MCPR) safety limits.

Such neutron flux oscillations, which have been determined to only occur under high power and low coolant flow operating conditions, are of basically two modes. One mode is a core wide oscillation, wherein all fuel assemblies participate in phase with each other in the oscillation. The second mode is a regional oscillation, wherein the neutron flux on one side of the core oscillates out-of-phase with the neutron flux on the other side. The axis of zero oscillation magnitude may be at any angle relative to the X-Y (horizontal) fuel bundle plane, rotate in the X-Y plane, or the two regions of the core of peak oscillation amplitude may shift from one location to another at a frequency slower than the oscillation frequency.

Existing in-core power monitoring instrumentation has been largely directed to monitoring average power by averaging the signals from selected neutron detectors widely distributed within the core. While such average power range monitoring (APRM) systems can detect and initiate action to suppress unacceptably high core-wide neutron flux oscillations, they do not reliably detect regional oscillations, since averaging detector signals that are relatively out of phase results in substantial cancellation.

There is thus an important need for an oscillation power range monitoring (OPRM) system that can detect the onset of both core-wide and regional neutron flux oscillations and reliably initiate an automatic suppression function (ASF) to suppress an oscillation prior to its exceeding safety limits. Such an OPRM system must also distinguish between instability related oscillations and oscillations resulting from normal reactor events, such as control rod maneuvers and pressure regulator transients, to avoid unnecessary ASF initiation. Also sufficient redundancy must be built into the system to accommodate a certain number of inoperative neutron detectors and/or spurious detector signals and still reliably detect instability-related neutron flux oscillations.

SUMMARY OF THE INVENTION

It is accordingly an object of the present invention to provide a monitoring system for detecting thermal-hydraulic instabilities in a nuclear reactor.

A further object is to provide a monitoring system of the above-character for detecting thermal-hydraulic instabilities capable of inducing sustained oscillations of a character potentially damaging to the reactor core.

Another object is to provide a monitoring system of the above-character, wherein neutron flux densities are monitored at axially and radially distributed locations throughout the reactor core to detect the onset of thermal-hydraulic induced instabilities.

An additional object is to provide a monitoring system of the above-character, wherein both core wide and regional neutron flux oscillations are reliably detected.

A further object is to provide a monitoring system of the above-character, wherein personnel are notified in the event the onset of a thermal-hydraulic instability-induced neutron flux oscillation is detected.

Yet another object is to provide a monitoring system of the above-character, wherein an automatic suppression function is initiated in response to the detection of core wide and regional oscillations, including oscillation of a single fuel bundle.

A still further object is to provide a monitoring system of the above-character, which is capable of reliably distinguishing between instability-induced oscillations requiring suppression and oscillations resulting from normal reactor events.

Yet another object is to provide a method for detecting and initiating suppression of thermal-hydraulic instabilities in a nuclear reactor.

Other objects of the invention will in part be obvious and in part appear hereinafter.

In accordance with the present invention, there is provided a system and method for monitoring core-wide and local neutron flux oscillations induced in a nuclear reactor due to thermal-hydraulic instabilities and signalling the initiation of appropriate action to suppress such oscillations at their onset. To this end, the detector signals from local power range monitoring strings, radially distributed throughout the reactor core, are selectively assigned to a core-wide array of oscillation power range monitoring cells to develop unique monitoring cell output signals representative of the average neutron flux density or power existing at highly localized regions distributed throughout the reactor core.

A plurality of oscillation power range monitoring channels are respectively assigned to selected groups of monitoring cells distributed throughout the core in geographically overlapping and partially lapping relations. The output signal of each monitoring cell is repetitively sampled and processed to detect oscillations thereof which are characteristic of the onset of a thermal-hydraulic instability. An alarm is issued when such oscillations are detected. When a signal oscillation of a particular monitoring cell exhibits two consecutive peaks of increasing amplitudes meeting certain setpoint and frequency criteria, the assigned monitoring channel is tripped. If at least two monitoring channels are tripped, an unacceptable thermal-hydraulic instability is reliably indicated, and a reactor control function is initiated to suppress the instability.

The invention accordingly comprises the features of construction, combinations of elements and arrangements of parts, as well as a method including a plurality of method steps, all as detailed below, and the scope of the invention will be indicated in the claims.

BRIEF DESCRIPTION OF THE DRAWINGS

For a full understanding of the nature and objects of the present invention, reference may be had to the following Detailed Description taken in conjunction with the included drawings, in which.

Like reference numerals refer to corresponding parts throughout the several views of the drawings.

DETAILED DESCRIPTION

Figure 2:
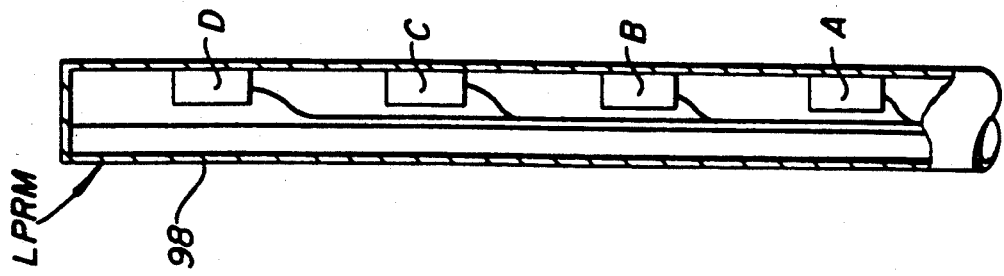
FIG. 2 is an elevational view, partially broken away, of one of the local power range monitoring (LPRM) strings utilized in the system of FIG. 1.

The oscillation power range monitoring system of the present invention takes advantage of available local power range monitor (LPRM) strings distributed throughout the core of a boiling water reactor (BWR). Each LPRM string includes a hollow tube 98 containing typically four spaced neutron detectors A, B, C and D, as seen in FIG. 2. The tubes are vertically oriented between the fuel assemblies in coextensive relation with the length of the active fuel portion of the fuel rods thereof, such that the neutron detectors can monitor local power densities at four distinct axial regions for each of the LPRM string locations radially distributed throughout the core.

Figure 1:
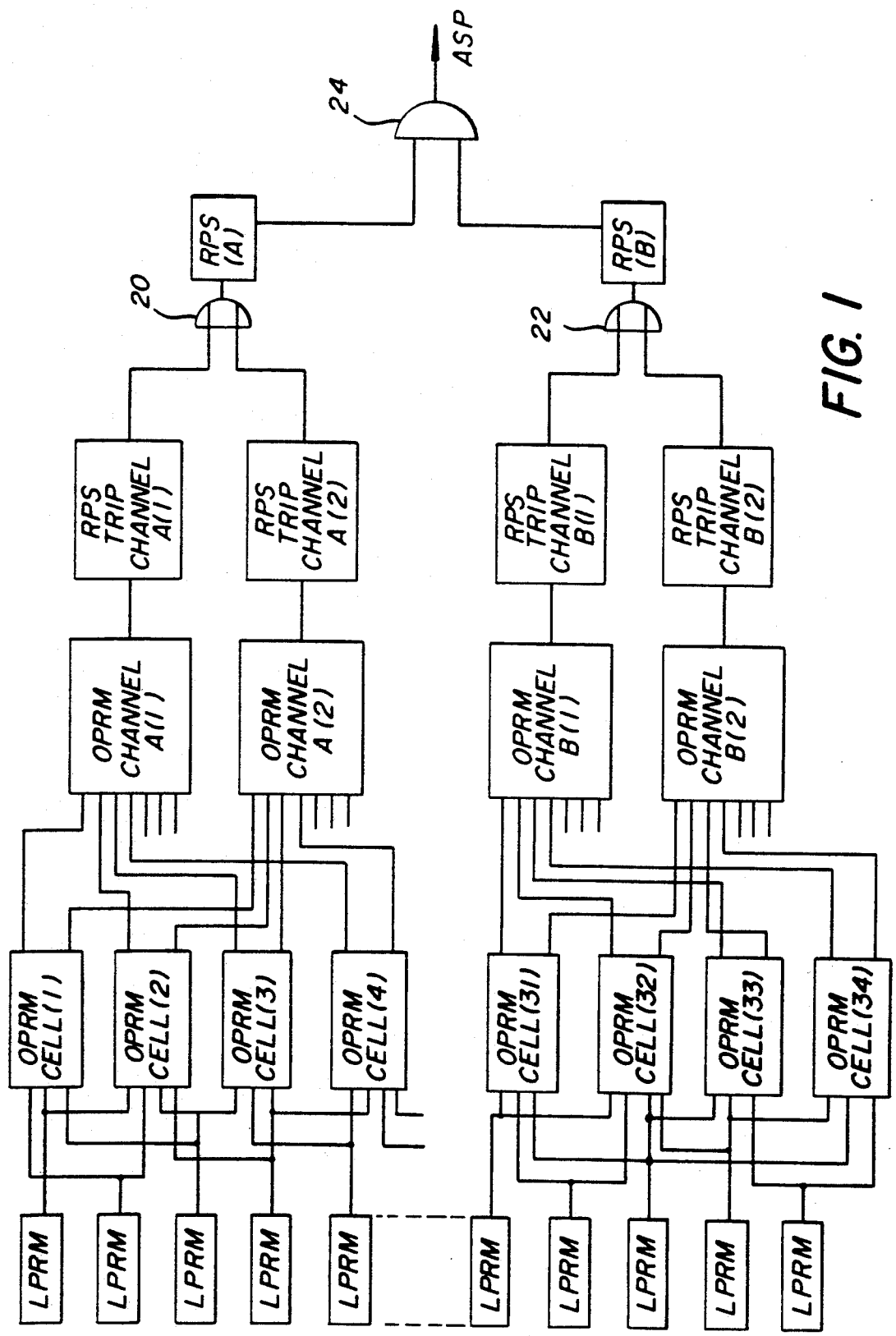
FIG. 1 is a block diagram of one embodiment of an oscillation power range monitoring system constructed in accordance with the -present invention.

In accordance with the present invention and as seen in FIG. 1, the signals produced by the LPRM string detectors A, B, C and D are grouped together in a novel manner to define oscillation power range monitoring (OPRM) cells. The same LPRM detector signals are applied to plural OPRM cells corresponding to adjacent geographical areas of the core. Two sets of detector signals from the LPRM strings defining each cell are averaged to provide a pair of cell output signals to an assigned pair of oscillation power range monitoring (OPRM) channels where they are sampled at regular intervals to determine, pursuant to an OPRM trip algorithm, if a neutron flux oscillation produced by a thermal-hydraulic instability exists. If the oscillations meet the requisite criteria, an OPRM channel issues a channel trip signal to a reactor protection system (RPS).

To provide reliability against responses to spurious channel trip signals, four OPRM channels A(1), A(2), B(1) and B(2) are utilized. A first geographical array of OPRM cells provide inputs to both OPRM channels A(1) and A(2), while a second geographical array interpersed with the first array provides inputs to both OPRM channels B(1) and B(2). Trip signals from OPRM channels A(1) and A(2) are respectively applied to trip conventional reactor protection system (RPS) trip channels A(1) and A(2), and signals indicating OPRM channel tripped conditions are ORed together in a gate 20 for application to a conventional reactor protection system RPS(A). Similarly, trip signals from OPRM channels B(1) and B(2) are respectively applied to trip conventional reactor protection system (RPS) trip channels B(1) and B(2). Signals indicating OPRM channel tripped conditions are ORed together in a gate 22 for application to reactor protection system RPS(B). A channel trip signal passed by gate 20 produces a trip output from RPS(A), while a channel trip signal passed by gate 22 produces a trip output from RPS(B). These trip outputs are ANDed together in a gate 24 to produce an automatic suppression function (ASF) output initiating action to suppress an oscillation prior to exceeding minimum critical power ratio (MCPR) safety limits. The ASF output may be used to reduce reactor power by, for example, initiating a select rod insert (SRI) function or a complete reactor shutdown (SCRAM).

From FIG. 1, it is seen that the trip logic required to initiate an ASF function requires that at least one OPRM cell assigned to OPRM channels A(1) and A(2) and at least one OPRM cell assigned to OPRM channels B(1) and B(2) must detect an oscillation manifesting the requisite signal characteristics.

Figure 3:
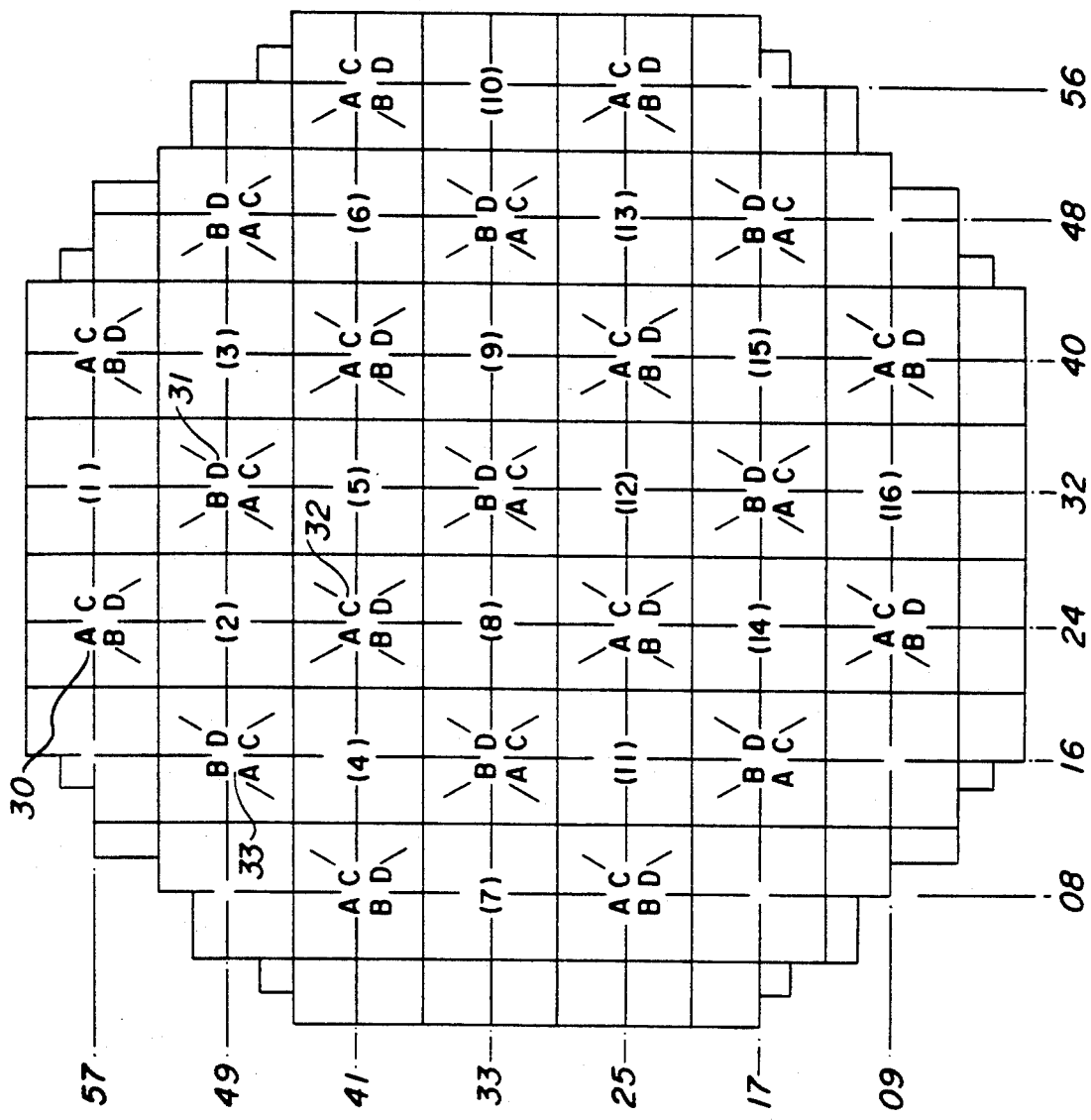
FIGS. 3 and 4 are simplified plan views of a large nuclear reactor core illustrating the core-wide distribution of LPRM strings and oscillation power range monitoring (OPRM) cells utilized in the system of FIG. 1.
Figure 4:
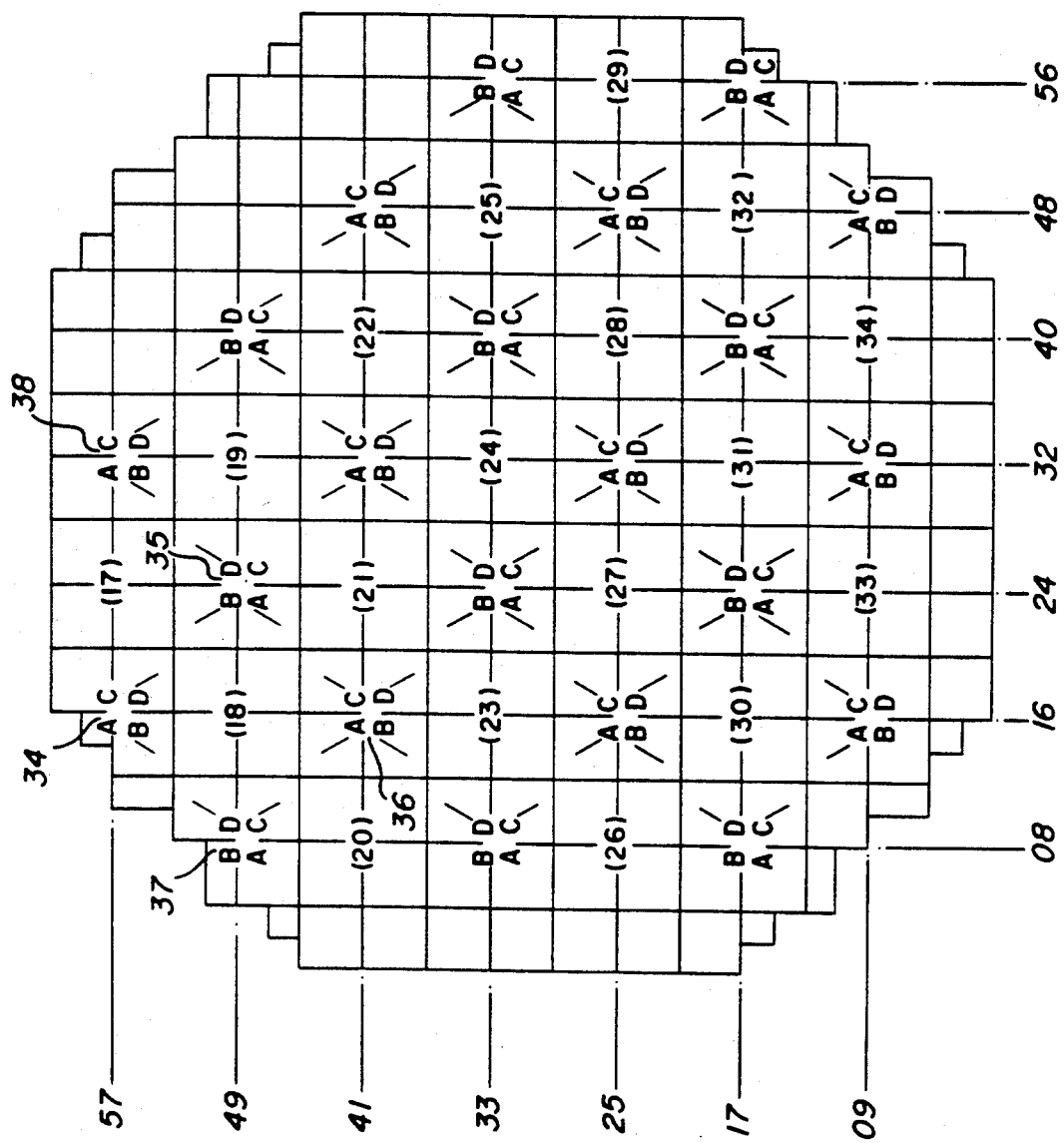

An example of LPRM string to OPRM cell to OPRM channel assignments in accordance with the present invention for a large core, e.g. 764 bundles, is shown in FIGS. 3 and 4. Such a core may have 43 available LPRM strings which have been assigned to 34 OPRM cells (1) to (34) in order to provide full core coverage with adequate reliability and redundancy to detect core wide oscillations and regional oscillations down to oscillations of a single fuel bundle. As seen in FIGS. 3 and 4, OPRM cell assignments are made based on diamond geometrical relationships of the LPRM strings throughout the core. FIG. 3 illustrates the core locations for the LPRM strings assigned to OPRM cells (1)–(16). Thus, OPRM cell (2) is assigned detectors of LPRM strings 30, 31, 32 and 33 at the four points of its diamond. Note that detectors of LPRM strings 30 and 31 are also assigned to OPRM cell (1), detectors of strings 32 and 33 are also assigned to OPRM cell (4), detectors of strings 31 and 32 are also assigned to OPRM cell (5), and detectors of string 31 is also assigned to OPRM cell (3). Where one of the points of a OPRM cell-defining diamond lies beyond the core periphery, a cell is represented by the remaining three points, as in the case of OPRM cells (1), (7), (10) and (16) in FIG. 3. If two points of a diamond lie beyond the core periphery, a OPRM cell is not defined. The upper two letters indicated at each diamond point identify those detectors of the LPRM string thereat whose signals are combined as an OPRM cell signal for input to OPRM channel A(1) of FIG. 1. Thus, for OPRM cell (2) in FIG. 3, the signals from detectors A and C of LPRM strings 30 and 32 and the signals from detectors B and D of LPRM strings 31 and 33 are combined for input to OPRM channel A(1). The lower two letters indicated at each diamond point identify the detectors of the LPRM string whose signals are combined as a cell input to OPRM channel A(2). Thus, for LPRM strings 30 -33, the signals of detectors B and D of strings 30 and 32 and detectors A and C of strings 31 and 33 are combined as the OPRM cell (2) input to OPRM channel A(2).

FIG. 4 shows the core locations of the LPRM strings assigned to OPRM cells (18)–(34) whose outputs are applied to OPRM channels B(1) and B(2). From a comparison of FIGS. 3 and 4, it is seen that the OPRM cell locations in FIG. 4 are shifted one cell position leftward relative to the cell locations in FIG. 3. Thus, a LPRM string at a point of a cell diamond in FIG. 3 is located at the geometrical center of a cell diamond in FIG. 4, and vice versa. As seen in FIG. 4, LPRM strings 34–37 are assigned to OPRM cell (18), and LPRM strings 34 and 35 are also assigned to OPRM cell (17), along with LPRM string 38. The signals from detectors A and C of strings 34 and 36 and detectors B and D of strings 35 and 37 are combined in OPRM cell (18) for application to OPRM channel B(1). The signals from detectors B and D of strings 34 and 36 and from A and C of strings 35 and 37 are combined in cell (18) for application to OPRM channel B(2) of FIG. 1.

It is seen that two detectors of each LPRM string provide inputs to the same OPRM channel via either two, three, or four OPRM cells. Each OPRM cell thus has at least six and in most cases eight detector signal inputs for application to one OPRM channel. This provides a significant cell overlap, thus ensuring reliable detection of oscillations occurring in a highly localized region of the core. Then to, the overlap existing between the four OPRM channels and the two reactor protection systems ensures against spurious initiation of ASF functions.

Rather than alternating the LPRM detector to OPRM channel assignments on a row to row basis, other assignment patterns may be better suited for smaller cores. For example, in FIG. 5, each of OPRM cells (1)–(11) is defined by LPRM strings at the corners of a square. For each indicated LPRM string location, the upper left letter identifies the detector whose signal goes to OPRM channel A(1), the lower left letter identifies the detector whose signal goes to OPRM channel B(1), the upper right letter identifies the detector whose signal goes to OPRM channel A(2), and the lower right letter identifies the detector whose signal goes to OPRM channel B(2). Thus each LPRM string provides one input to each of the four OPRM channels. The axial distribution of these LPRM signals between OPRM channels is uniform. The square geometry of the OPRM cells provides close spacing for the combined LPRM signals consistent with the smaller core size. For locations near the periphery of the core where one corner of the square does not include an LPRM string, the OPRM cells would use the detector inputs from the remaining three LPRM strings.

Figure 5:
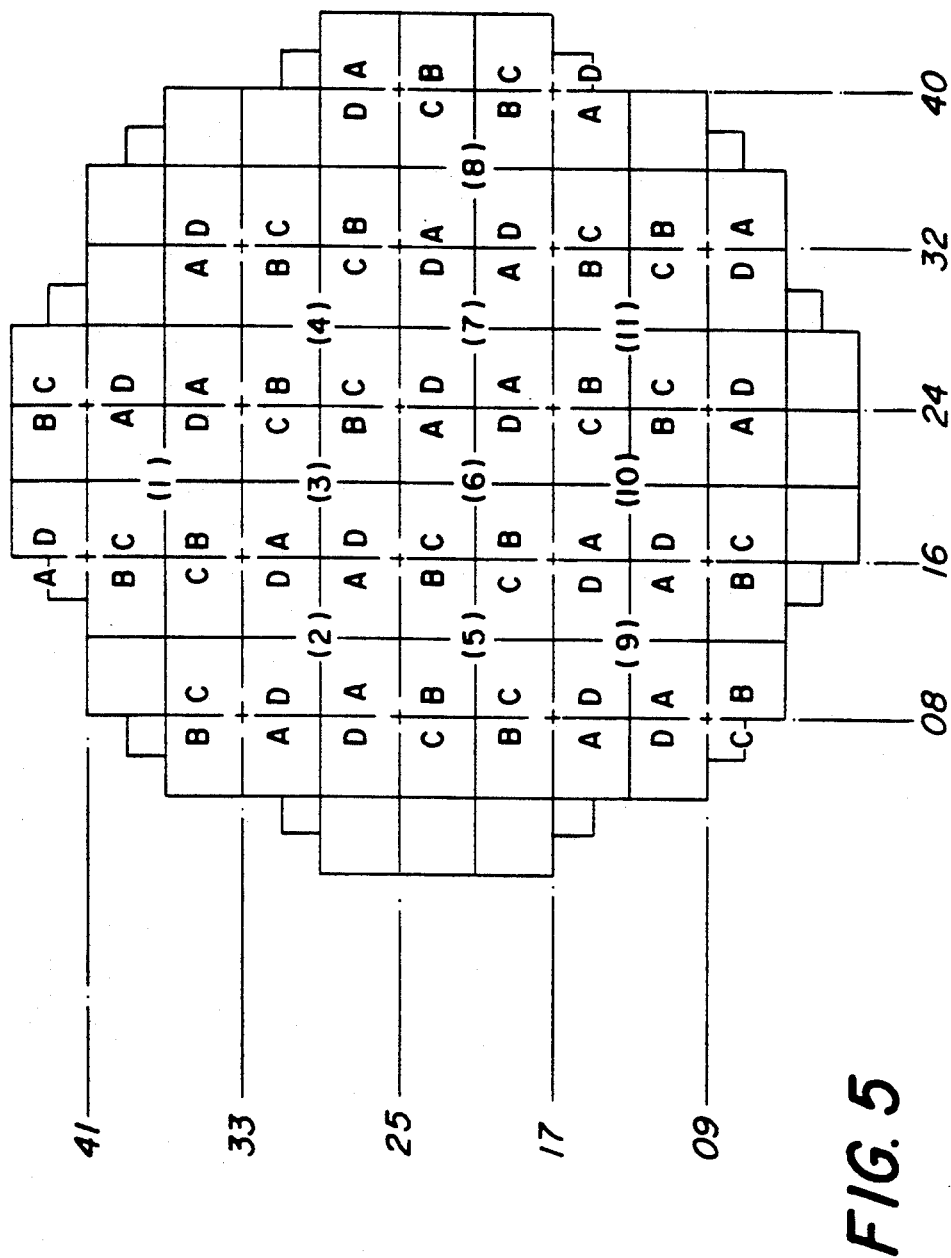
FIG. 5 is a simplified plan view of a smaller nuclear reactor core illustrating a core-wide distribution of LPRM strings and OPRM cells.

From FIGS. 3 through 5, it is seen that the various LPRM assignment schemes provide OPRM channel redundancy. Each LPRM string of four detectors feeds signals to at least two OPRM channels for complete regional redundancy within a reactor protection system RPS (A or B). The OPRM detectors associated with the two reactor protection systems are essentially equal in sensitivity due to the OPRM cell overlap in the large cores and the pattern of shared detectors in the small cores. Monitoring multiple axial locations in each LPRM string assures reliability, and, together with the overlap of multiple OPRM cells, provides ample tolerance for bypassed detectors in any one OPRM cell.

Figure 6A:
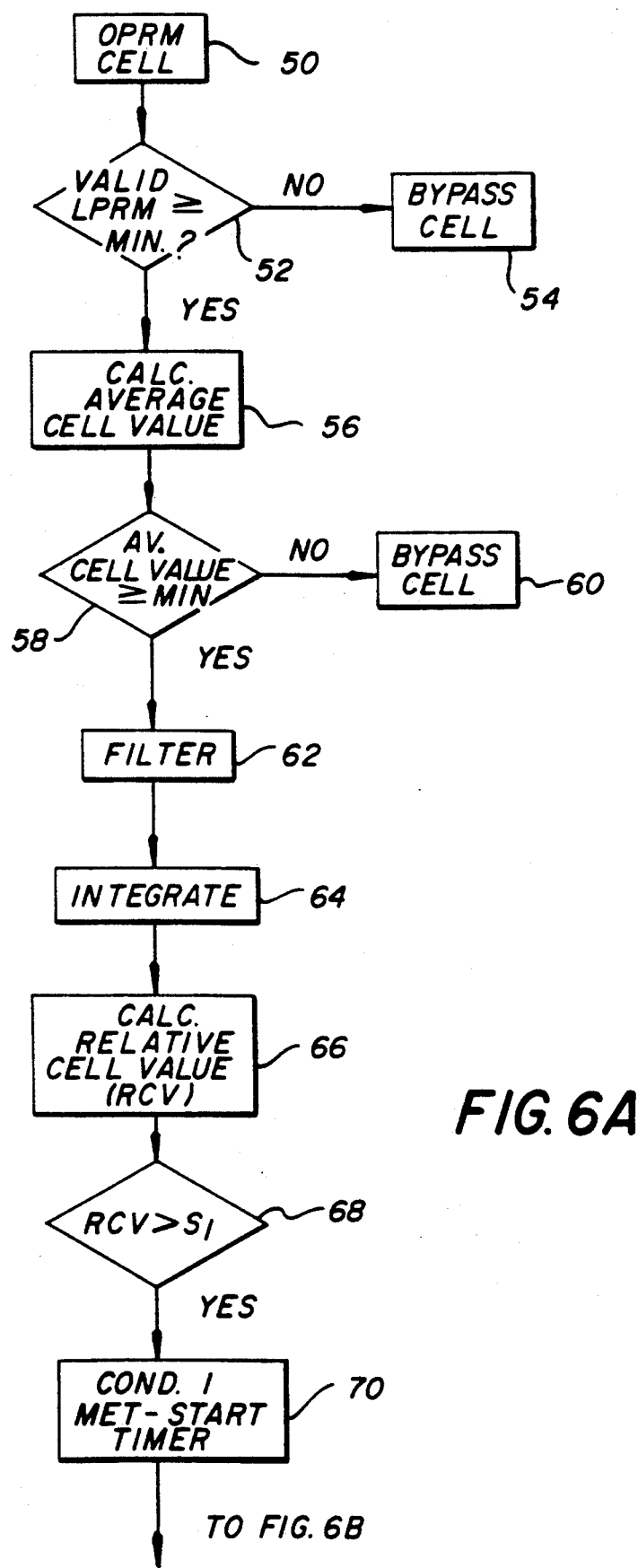
FIGS. 6A and 6B, in combination, comprise a flow chart illustrating the processing of each OPRM cell output signal pursuant to detecting a thermal-hydraulic instability-induced neutron flux oscillation.
Figure 6B:
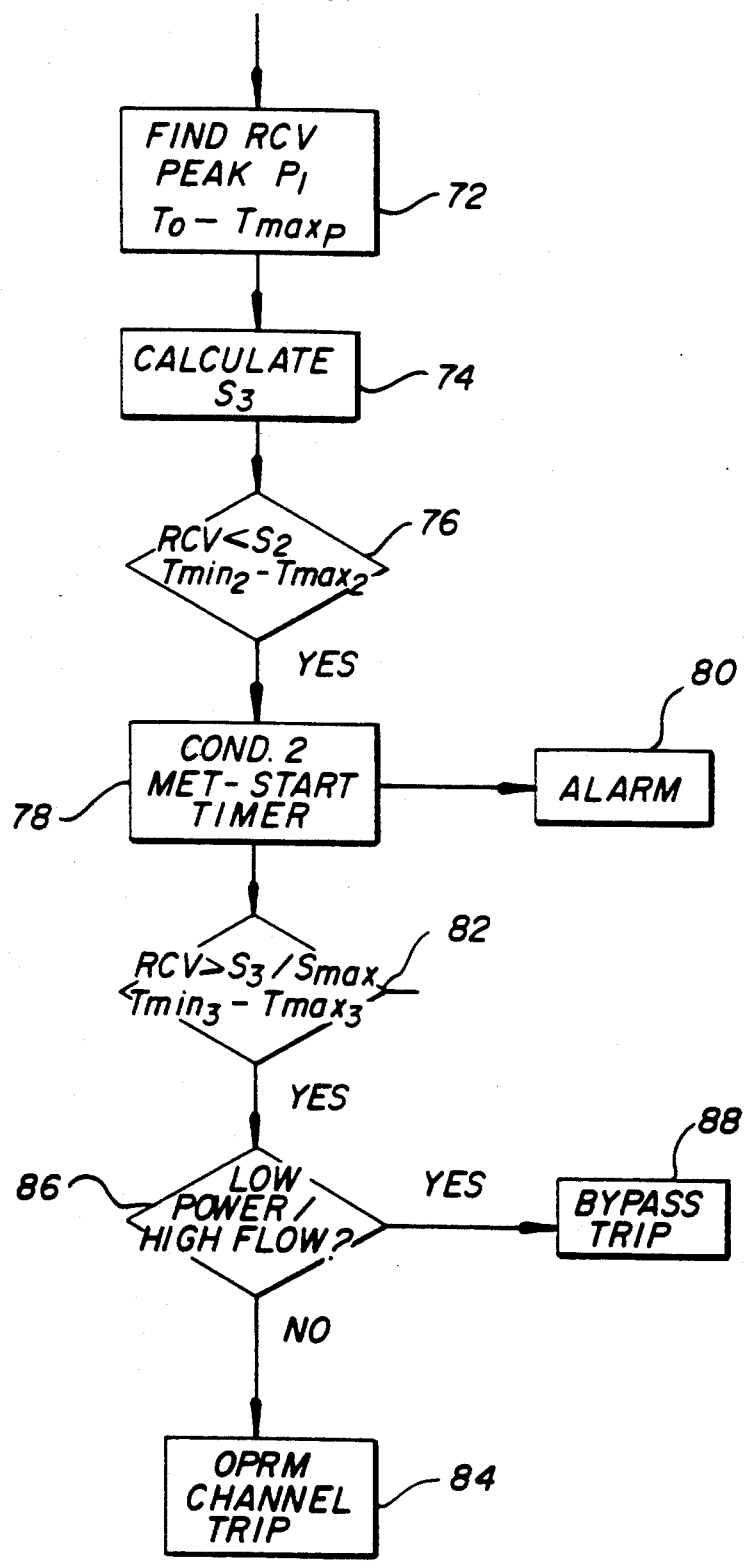

The flow chart of FIGS. 6A and 6B illustrates the manner in which the LPRM detector signals of each OPRM cell are processed to reliably detect thermal-hydraulic instabilities. Each OPRM cell is regularly sampled at an appropriate rate, e.g. every 0.05 seconds, to ensure an accurate representation of an expected neutron flux oscillation, i.e., 0.3 to 0.7 Hz. Referring first to FIG. 6A, the LPRM detector signals assigned to an OPRM cell, represented by block 50, are tested in decision block 52 for valid signal levels. It is not uncommon to have a number of defective neutron flux detectors due to electrical or mechanical failure. However, even with a number of its LPRM detectors in defective conditions, an OPRM cell can still reliably manifest neutron flux oscillations which must be detected. Thus, if decision block 52 determines that the number of valid LPRM signals is equal to or greater than an acceptable minimum, e.g. three, processing continues. If not, the OPRM cell is bypassed, as indicated by block 54. The accepted number of valid LPRM signals are averaged together (block 56) to provide an average OPRM cell signal value which is tested against a minimum cell value (block 58). If the average cell value is less than an acceptable minimum value, the OPRM cell is bypassed, as indicated by block 60. An accepted average cell value is digitally filtered (block 62) to remove high frequency components, e.g. greater than 2-5 Hz, to provide a conditioned OPRM cell signal value. This conditioned cell value is then integrated (block 64) to produce a time-averaged value (5–7 second time constant) indicative of the thermal power in the localized core region corresponding to the OPRM cell location. Next, a relative OPRM cell signal value RCV is calculated (block 66) by dividing the conditioned cell value by the time-averaged cell value.

Figure 7:
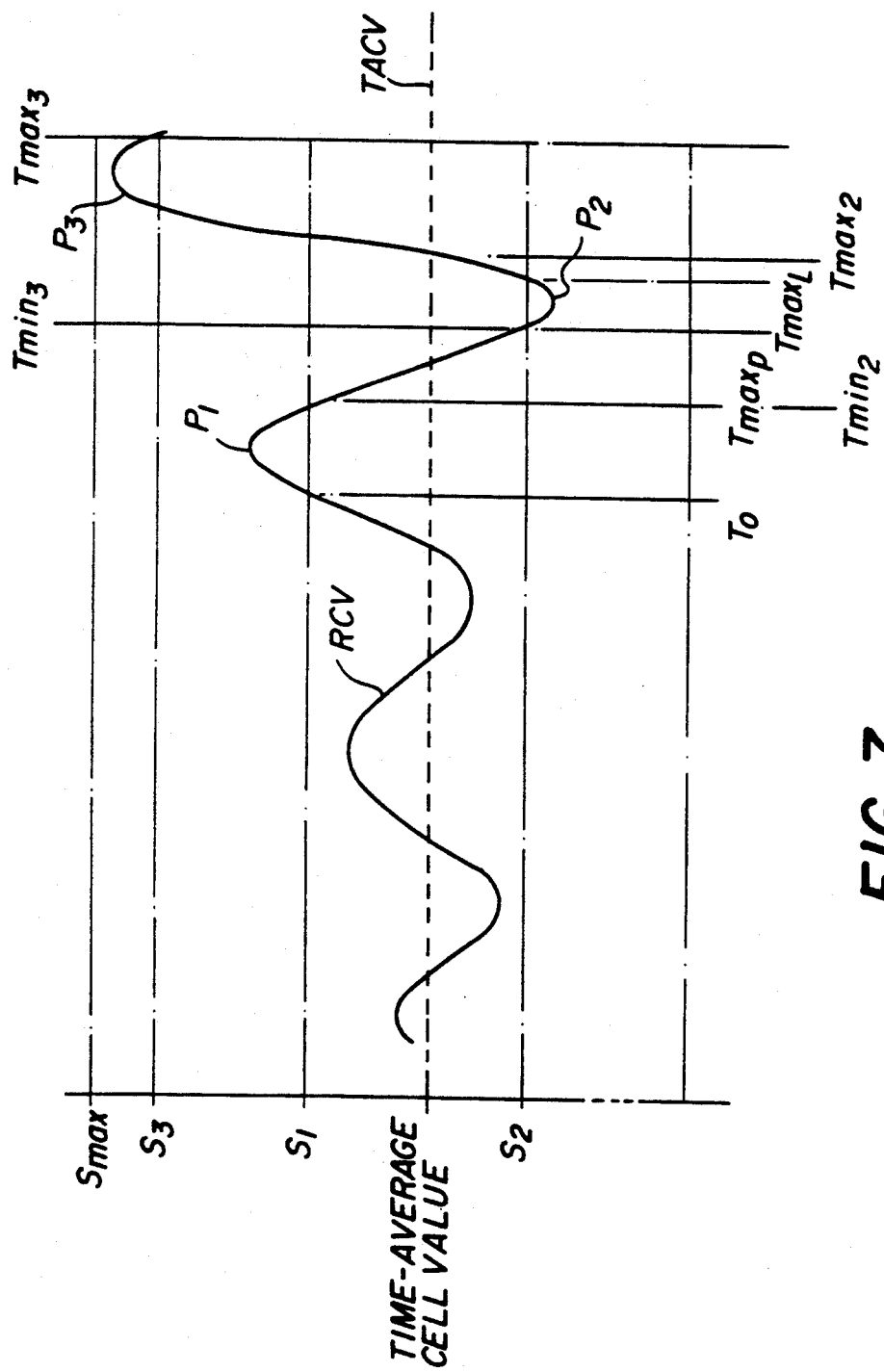
FIG. 7 is a diagram of an OPRM cell output signal that is processed in accordance with the flow chart of FIGURES A and 6B and exhibits an oscillation indicative of a thermal-hydraulic instability requiring suppression.

Before continuing with the description of the flow chart, reference is made to FIG. 7 which illustrates several cycles of a relative OPRM cell value RCV manifesting a thermal-hydraulic instability induced neutron flux oscillation. Signal level TACV represents the time-average cell value determined in block 64 of FIG. 6A. Horizontal line $S_1$, represents a setpoint established at a level greater than signal level TACV by an appropriate percentage, e.g. ten percent. In block 68 of FIG. 6A, the instantaneous relative OPRM cell value signal RCV is continuously compared against setpoint $S_1$, looking for a positive excursion in excess thereof. When this setpoint is exceeded, a logic Condition 1 is met and a timer is initialized, as represented by block 70. This timer generates a pair of time windows $T_o - Tmax_p$ and $Tmin_2 - Tmax_2$. During $T_o - Tmax_p$, a search is made for a positive peak $P_1$ (block 72 of FIG. 6B). If a peak is found, trip setpoint $S_3$ is calculated (block 74) as a requisite percentage increase in amplitude from peak $P_1$ to the next positive peak $P_3$, as seen in FIG. 7. For example, if the requisite percentage increase is twenty percent and peak $P_1$ was found to be thirty percent above time-averaged cell value TACV, then setpoint $S_3$ is establish at fifty six percent above TACV, taken as a baseline of one, i.e., $S_3 = P_1 \times \%$ increase or $1.3 \times 1.2 = 1.56$. Thus, trip setpoint $S_3$ is a floating threshold level depending upon the amplitude of each peak $P_1$.

Figure 8:
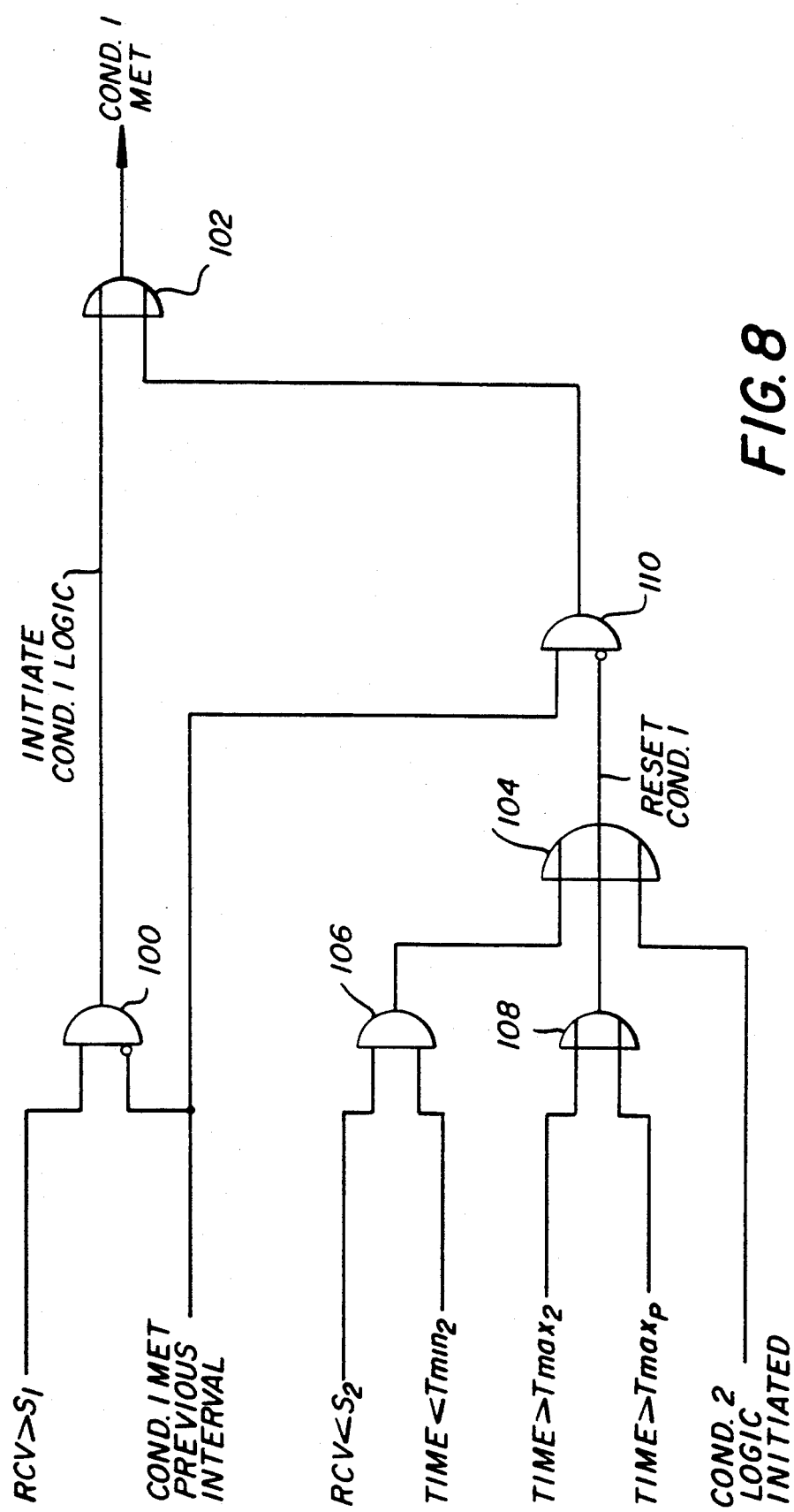

During time window $Tmin_2 - Tmax_2$, the instantaneous relative cell value RCV is compared (decision block 76) against a minimum set point $S_2$, which may be established at ten percent below the time-averaged cell value TACV. If a negative excursion drops below setpoint $S_2$ within time window $Tmin_2 - Tmax_2$, logic Condition 2 is met and a timer is initialized (block 78) to generate a time window $Tmin_3 - Tmax_3$ during which a search is made for the next positive peak $+P_3$ (FIG. 8). In addition, when Condition 2 is met, an alarm is sounded (block 80) indicating to personnel that the onset of a potential thermal-hydraulic instability has been identified. This logic Condition 2 timer also sets a time window $Tmin_2 - Tmax_L$ during which to look for a negative peak or valley $P_2$.

Assuming logic Condition 2 is met, a search is made for an instantaneous relative cell value RCV rising above calculated setpoint $S_3$ within the time window $Tmin_3 - Tmax_3$, as indicated by decision block 82 in FIG. 6B. If this occurs, logic Condition 3 is met, and the particular OPRM channel to which the sampled OPRM cell is assigned issues a channel trip signal (block 84) to its assigned RPS trip channel, as seen in FIG. 1. In addition, an OPRM channel is tripped if peak $P_3$ exceeds an absolute maximum trip setpoint $S_{max}$ so as to respond to a slowly growing oscillation having a growth rate less than the percentage increase from peaks $P_1$ to $P_3$ established in block 74 of FIG. 6B.

To prevent spurious tripping of an OPRM channel while the reactor is under either high coolant flow conditions, e.g., above sixty percent, or low power conditions, e.g., less than thirty percent, during which thermal-hydraulic instabilities do not occur, decision block 86 is included to bypass a channel trip function (block 88) during such inherently stable operating conditions. However, while the reactor is operating at less than sixty percent flow or greater than thirty percent power, a channel trip function is fully operational.

Figure 10:
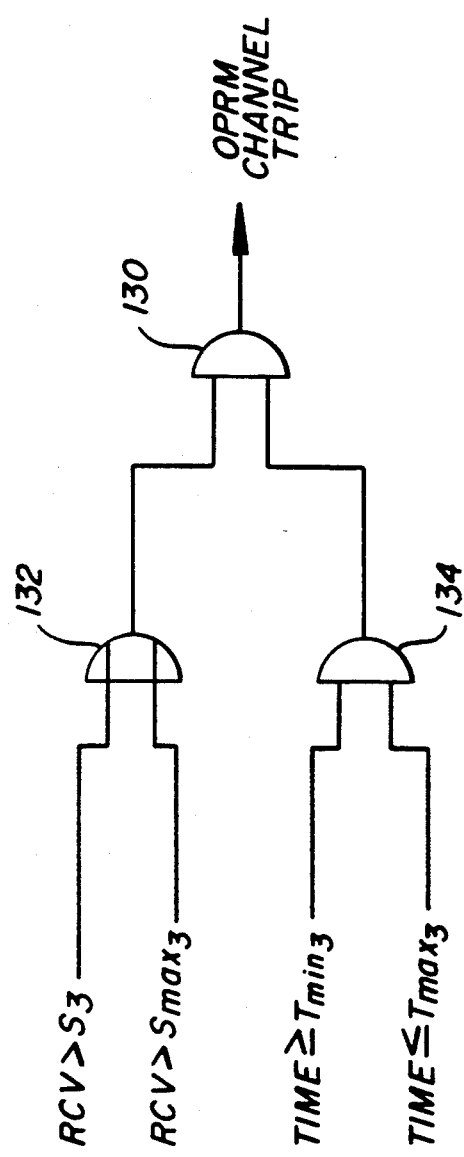
FIGS. 8, 9 and 10 are a series of logic diagrams illustrating further details of the flow chart of FIGS. 6A and 6B.
Figure 9:
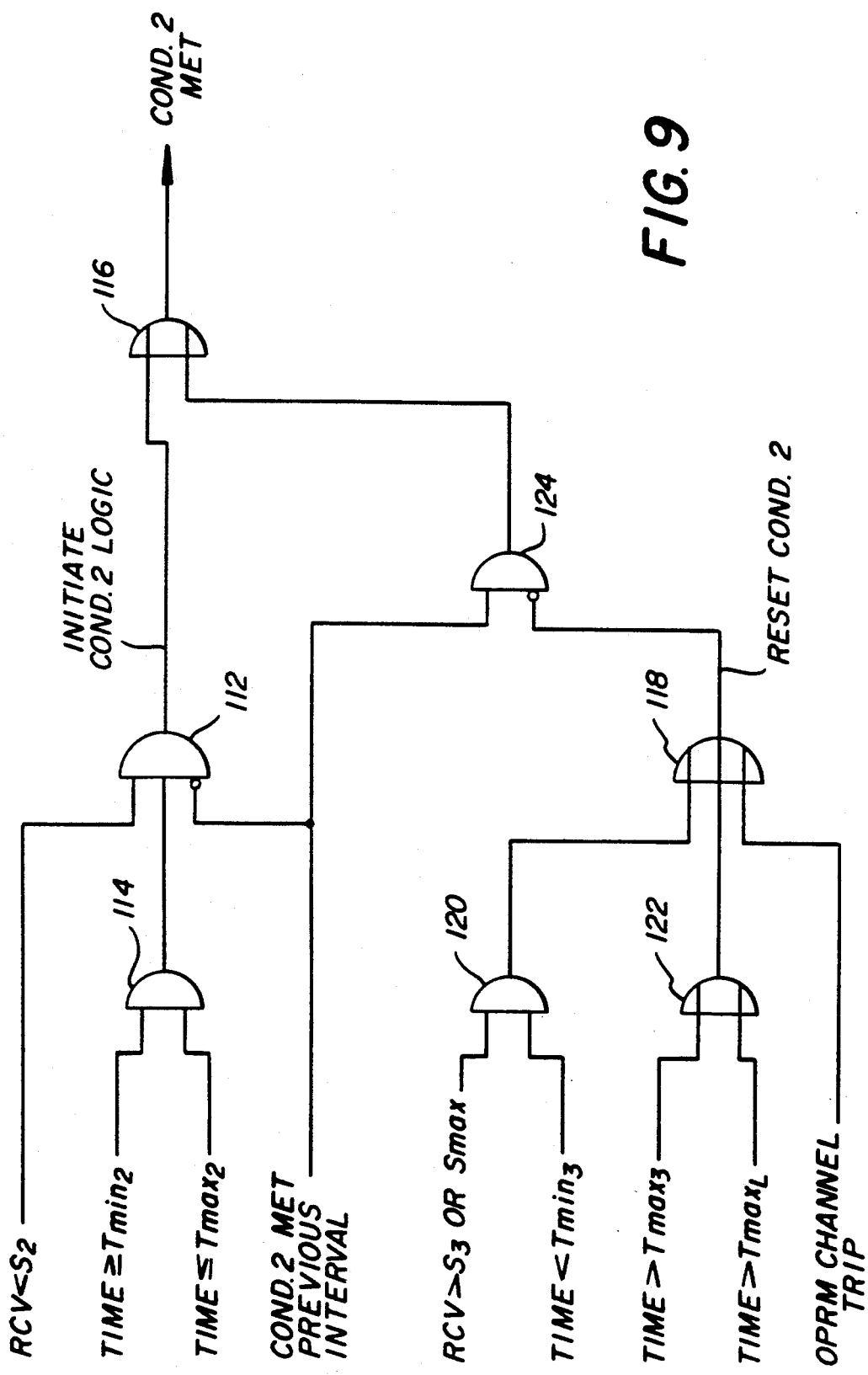

FIGS. 8, 9, and 10 illustrate logic circuitry to determine if any one of the logic Conditions 1, 2 and 3 have been met and to reset or initialize the various timers at the completion of each OPRM cell sampling interval. Each condition's logic has three basic components to 1) determine if, during the sampling interval, the associated trip setpoint has been exceeded for the first time and to thereby initiate the logic for that condition, 2) determine whether circumstances exist in the sampling interval that would result in resetting the condition logic, e.g., time has expired before setpoint is exceeded, and 3) determine whether the condition's logic remains satisfied during the sampling interval.

The Condition 1 logic seen in FIG. 8 illustrates that this condition is met when $RCV > S_1$ is true, i.e., goes to a logical ONE and Condition 1 was not met in the previous sampling interval, i.e., a logical ONE. AND gate 100 is thus enabled to pass a logical ONE signal to OR gate 102 and out as a Condition 1 met signal, and the Condition 1 timer is initialized. The Condition 1 logic is reset from the output of OR gate 104 if 1) AND gate 106 determines that signal RCV has dropped below $S_2$ before the start of time window $Tmin_2 - Tmax_2$ (a too rapid negative excursion uncharacteristic of a thermal-hydraulic instability), 2) OR gate 108 determines that time $Tmax_p$ has expired and no peak $P_1$ was found, or time $Tmax_2$ has expired and no valley $P_2$ was found, or 3) the Condition 2 logic of FIG. 9 has been initiated. If the Condition 1 logic is not reset at the output of OR gate 104, AND gate 110 is enabled to pass a logical ONE signal through to OR gate 102 if the Condition 1 logic was met (true) in the previous sampling interval.

In the Condition 2 logic of FIG. 9, AND gate 112 passes a logical ONE initiate Condition 2 logic signal when the relative cell value signal RCV drops below setpoint $S_2$ during time window $Tmin_2 - Tmax_2$ established by AND gate 114 and the Condition 2 logic was not met during the previous sampling interval. A logical ONE output from AND gate 112 passes through OR gate 116 as a Condition 2 met signal, and the appropriate timer is initialized. The Condition 2 logic is reset from the output of OR gate 118 if 1) AND gate 120 determines that either of trip setpoints $S_3$ or $S_{max}$ is exceeded prior to time $Tmin_3$, indicative of a too rapid rise toward peak $P_3$ uncharacteristic of a thermal-hydraulic instability, 2) OR gate 122 determines that time $Tmax_L$ has expired and no valley $P_2$ was found, or time $Tmax_3$ has expired and setpoints $S_3$ or $Smax$ were not exceeded, or 3) the Condition 3 logic of FIG. 10 has been met (OPRM channel trip signal issued) If the Condition 2 logic is not reset at the output of OR gate 118, AND gate 124 is enabled to pass a logical ONE signal through to OR gate 116, if the Condition 2 logic was met in the previous sampling interval.

In the Condition 3 logic of FIG. 10, AND gate 130 is enabled if either of setpoints $S_3$ or $S_{max}$ is exceeded by signal RCV (OR gate 132) during time window $Tmin_3 - Tmax_3$ (AND gate 134). A logical ONE OPRM channel trip signal at the output of AND gate 130 triggers the assigned one of the RPS trip channels to a latched trip condition.

Because of the logic flow, Conditions 1, 2 and 3 are evaluated in reverse order, i.e., first Condition 3, then Condition 2, and finally Condition 1. At the end of a sampling interval, timers and latches are updated or reset as appropriate. This reverse order of evaluation allows the Condition 1 logic to continue searching for successive peaks $P_1$ exceeding setpoint $S_1$ which may initiate the Condition 3 logic even while the current peak is being evaluated against trip setpoint $S_3$. If the current peak does not exceed the trip setpoint $S_3$, it may however be large enough to exceed setpoint $S_1$, in which case the Condition 1 logic is again met to trigger another search for a next valley $P_2$ and peak $P_3$ exceeding setpoints $S_2$ and $S_3$, respectively.

From the foregoing, it is seen that the objects set forth above, including those made apparent from the proceeding Detailed Description, are efficiently attained, and, since certain changes may be made in the constructions set forth without departing from the present invention, it is intended that matters of detail be taken as illustrative and not in a limiting sense.

Having described the invention, what is claimed as new and desired to secure by Letters Patent is:

1. An oscillation power range monitoring system for a nuclear reactor having a core including a plurality of vertically oriented fuel assemblies, said system comprising, in combination:
- A. a plurality of power monitoring strings radially distributed throughout said core in contiguous relation with said fuel assemblies, each said monitoring string including a plurality of neutron flux detectors arranged in vertically spaced relation;
- B. a plurality of oscillation monitoring cells radially distributed throughout said core, each said monitoring cell receiving detector signals from selected said detectors of those of said monitoring strings situated in the local vicinity thereof and providing a cell output signal representative of a combination of said detector signals received thereby;
- C. a plurality of oscillation monitoring channels, each assigned to a selected array of said monitoring cells;
- D. means for individually processing said output signals of said monitoring cells in repeating sequence to detect oscillations thereof and operating to trip the assigned ones of said monitoring channels when said oscillations indicate a thermal-hydraulic instability; and
- E. means for issuing an oscillation suppression function signal when at least two of said monitoring channels are tripped.

2. The oscillation power range monitoring system defined in claim 1, wherein said detectors of each said monitoring string provide said detector signals to multiple said monitoring cells in contiguous relation.

3. The oscillation power range monitoring system defined in claim 2, wherein each said monitoring cell provides at least two unique said cell output signals.

4. The oscillation power range monitoring system defined in claim 3, wherein each said monitoring string includes at least four said detectors, said detector signals being combined in unique combinations depending on the vertical positions of said four detectors to provide said unique cell output signals.

5. The oscillation power range monitoring system defined in claim 4, wherein said unique cell output signals of each said monitoring cell are assigned to different said monitoring channels.

6. The oscillation power range monitoring system defined in claim 5, wherein each said monitoring cell receives said detector signal inputs from a unique group of said monitoring strings locally situated thereabout in a rectangular geometrical configuration.

7. The oscillation power range monitoring system defined in claim 5, wherein said processing means includes a filter for removing components of said cell output signals of a frequency in excess of a characteristic frequency range of a thermal-hydraulic instability.

8. The oscillation power range monitoring system defined in claim 5, wherein said processing means includes threshold detector means operating to trip one of said monitoring channels when an oscillation of one of said cell output signals includes a first peak of an amplitude exceeding a first setpoint immediately followed by a second peak of an amplitude exceeding a second higher setpoint occurring within a predetermined time window.

9. The oscillation power range monitoring system defined in claim 8, wherein said threshold detector means further operates to establish said predetermined time window based on said oscillation further including a valley intermediate said first and second peaks having an amplitude exceeding a third setpoint.

10. A method for monitoring thermal-hydraulic instabilities in a nuclear reactor having a core including a plurality of vertically oriented fuel assemblies, said method including the steps of:
- A. providing a plurality of power monitoring strings radially distributed throughout said core in contiguous relation with said fuel assemblies, each said monitoring string including a plurality of neutron flux detectors arranged in vertically spaced relation;
- B. assigning unique, contiguous geometrical groupings of said monitoring strings respectively to different oscillation monitoring cells;
- C. deriving an output signal for each said monitoring cell representative of signals issued by said detectors of said monitoring strings assigned thereto;
- D. assigning respective pluralities of said cell output signals to different oscillation monitoring channels;
- E. repetitively sampling said cell output signals;
- F. tripping a monitoring channel when the cell output signal assigned thereto exhibits an oscillation characteristic of a thermal-hydraulic instability; and
- G. indicating an existing thermal-hydraulic instability when at least two of said monitoring channels assigned to geographically adjacent monitoring cells are tripped.

11. The method defined in claim 10, wherein each said monitoring string includes at least four detectors, said method further including the step of combining said detector signals of each said group of said monitoring strings depending on the positions of said detectors thereof to provide said output signal for said monitoring cell assigned thereto.

12. The method defined in claim 10, wherein each said monitoring string is assigned to at least two geographically adjacent said monitoring cells.

13. The method defined in claim 12, which further includes the step of assigning different groupings of said monitoring channels to at least two separate reactor protection systems, wherein each said monitoring channel grouping includes assigned monitoring cells located in geographically adjacent relation, and said indicating step indicates an existing thermal-hydraulic instability when at least one monitoring channel assigned to each reactor protection system is tripped.

14. The method defined in claim 12, which further includes the step of initiating a reactor control function to suppress a thermal-hydraulic instability when at least two of said monitoring channels are tripped.

15. The method defined in claim 14, which further includes the step of bypassing said reactor control function when the reactor is operating within predetermined ranges of either low power or high coolant flow conditions during which thermal-hydraulic instabilities of concern do not occur.

16. The method defined in claim 12, wherein said tripping step includes
1) testing the amplitude of each oscillation peak of a sampled cell output signal against a first setpoint,
2) when each first setpoint is exceeded, testing the amplitude of each next oscillation peak against a second setpoint of a predetermined higher level than said first setpoint, and
3) tripping the assigned monitoring channel when said second setpoint is exceeded.

17. The method defined in claim 16, wherein said tripping step further includes 1) establishing a first time window upon each instance said first setpoint is exceeded,
2) testing the amplitude of any immediately succeeding valley against a third setpoint, and
3) when said third setpoint is exceeded, establishing a second time window during which the next oscillation peak is tested against said second setpoint.

18. The method defined in claim 17, wherein said tripping step further includes 1) filtering a sampled cell output signal to remove high frequency components uncharacteristic of thermal hydraulic instability,
2) integrating said filtered cell output signal to produce a time-averaged cell output signal, and
3) dividing said filtered cell output signal by said time-averaged cell output signal to produce a relative cell output signal for testing against said setpoints.

* * * * *